UNITED STATES PATENT OFFICE.

THOMAS J. MAYALL, OF READING, MASSACHUSETTS.

PROTECTING METALLIC OBJECTS FROM RUST, &c.

SPECIFICATION forming part of Letters Patent No. 241,230, dated May 10, 1881.

Application filed March 24, 1881. (No specimens.)

*To all whom it may concern:*

Be it known that I, THOMAS J. MAYALL, of Reading, in the county of Middlesex and Commonwealth of Massachusetts, have invented a new and useful improvement in making all sorts and kinds of metallic articles and objects which it is necessary or desirable to protect from rust or corrosion, of which the following is a specification.

My invention relates to a covering or coating applied and attached to the surface of the metal, and to the composition of materials of which the covering or coating is made, and the manner of applying and affixing the covering or coating to the surface of the metal; and the object of my invention is to wholly prevent and obviate all danger of injury to the metallic objects by rusting or corrosion of the surface.

This invention is applicable to a large class of metallic objects, and especially so to such as are most exposed to the chemical action of the atmosphere, water, and gases. For water and gas pipes to be laid in the ground it will be found exceedingly valuable.

It is well known that iron pipes laid in the ground to conduct water, steam, or gas are likely to become, after a few years' service, so much rusted or corroded that they leak and are useless, and require to be replaced with new ones at great expense and inconvenience. My invention applied wholly obviates all such expense and inconvenience, as pipes made in accordance with it may be expected to last indefinitely—probably hundreds of years.

My invention consists in covering the surface of the metallic object, whatever it may be, with a thin coating of a compound of rubber and graphite, with sulphur enough to aid in vulcanization, and vulcanizing the compound on the metal.

To practice my invention I mix and thoroughly incorporate rubber in the proportion of one pound, pulverized graphite about three to five pounds, and sulphur about six ounces. This compound is then run out into sheets one thirty-second part of an inch thick, or, when necessary, of greater thickness. When it is practicable to do so, I cover the surface of the metal with these sheets, applied with or without cement, as the case may require, and then vulcanize the compound in any convenient way, so that it will become hard and metallic in its nature and appearance.

Where it is impracticable to apply the thin sheets of rubber and graphite compound to the surface of the metal, as in tubes of small diameter, I dissolve the rubber and graphite compound in naphtha or other similar solvent fluid and apply it, in the form of a thick liquid paint-like substance, to the surface of the metal to be coated in any suitable and convenient way. The outside of objects may be coated with a brush.

The inside of hollow articles may be most conveniently coated with the fluid compound by filling them with it, and then allowing all of it to drain out that will flow, or, if necessary, forcing it out by pressure of a current of air.

In applying the rubber and graphite compound in the form of a thick liquid care must be taken to keep the graphite from settling to the bottom.

Several coats of the liquid rubber and graphite compound may be applied to any object, if it is necessary, and when a sufficient quantity has been applied it is to be vulcanized in the same manner as when applied in the form of thin sheets, and the same hard metallic surface will be produced.

Any metal to be coated with the rubber and graphite compound should be first well cleaned of sand, scale, or other adhering substances. This compound of rubber, graphite, and sulphur, vulcanized onto the surface of metal so as to produce a hard product, will perfectly protect the metal covered with it from any and all chemical action of the atmosphere, gas, water, and all other fluids, even the strongest sulphuric and nitric acids, and so perfectly insulates it that it cannot be affected in any way by electric currents.

Metallic objects coated with the rubber and graphite compound cannot be used where there is a high degree of heat, but in a temperature below 300° nothing will affect the integrity of the coating except violent blows or abrasion.

Having thus fully described the said invention and the manner of carrying the same into effect, I would observe, in conclusion, that I do not claim, broadly, herein the compound of rubber, graphite, and sulphur, the same having been patented to me by Letters Patent No. 140,208, dated June 24, 1873; but What I do claim, and desire to secure by Letters Patent, is—

The improvement in the art of protecting metallic objects from rust or corrosion above described, consisting of covering the metallic surface with a coating of rubber, graphite, and sulphur compound and vulcanizing the compound onto the metallic surface, substantially as described, and for the purpose specified.

THOS. J. MAYALL.

Witnesses:
CHS. HOUGHTON,
F. L. HOUGHTON.